(12) United States Patent
Cash

(10) Patent No.: US 10,643,215 B2
(45) Date of Patent: May 5, 2020

(54) IN SITU AND NETWORK-BASED TRANSACTION CLASSIFYING SYSTEMS AND METHODS

(71) Applicant: NCR Corporation, Duluth, GA (US)

(72) Inventor: Charles Robert Cash, New Albany, OH (US)

(73) Assignee: NCR Corporation, Atlanta, GA (US)

( * ) Notice: Subject to any disclaimer, the term of this patent is extended or adjusted under 35 U.S.C. 154(b) by 172 days.

(21) Appl. No.: 15/664,818

(22) Filed: Jul. 31, 2017

(65) Prior Publication Data

US 2019/0034931 A1 Jan. 31, 2019

(51) Int. Cl.
*G06Q 20/40* (2012.01)
*G06Q 20/20* (2012.01)
*G06Q 20/38* (2012.01)

(52) U.S. Cl.
CPC ....... *G06Q 20/4016* (2013.01); *G06Q 20/202* (2013.01); *G06Q 20/206* (2013.01); *G06Q 20/389* (2013.01)

(58) Field of Classification Search
USPC .......................................................... 705/18
See application file for complete search history.

(56) References Cited

U.S. PATENT DOCUMENTS 9,818,136 B1 * 11/2017 Hoffberg ............ G06Q 30/0207
2016/0342963 A1 * 11/2016 Zoldi .................... G06N 7/005

* cited by examiner

*Primary Examiner* — Garcia Ade
(74) *Attorney, Agent, or Firm* — Schwegman, Lundberg & Woessner

(57) ABSTRACT

Various embodiments herein each include at least one of systems, methods, and software for in situ and network-based transaction classification. Such embodiments use advanced data analytics and machine learning techniques of consumer's transaction attributes to reduce shrink at checkout. One embodiment, in the form of a method, includes processing a dataset of transactions to identify normal transaction patterns and processing a dataset of transactions that included known fraud to identify variation patterns between the identified normal transaction patterns and the data of each transaction. The method further includes generating at least one pattern model based on the identified normal transaction patterns and the identified variation patterns. In such embodiments, each pattern model typically includes classification values for determining a likelihood of fraud in transactions. The method continues by applying the model to a current transaction to calculate a score indicative of a likelihood of fraud and outputs the score.

17 Claims, 4 Drawing Sheets

IN SITU AND NETWORK-BASED TRANSACTION CLASSIFYING SYSTEMS AND METHODS

BACKGROUND INFORMATION

Improving customer service and productivity at checkout continues to be a major strategy for retailers looking to grow in a competitive marketplace. Often, retailers need to balance these benefits against the necessity to provide security at checkout. Theft, or "shrink" (i.e., intentionally and unintentional), presents a confound to high checkout productivity as closely monitoring can be laborious and off-putting to customers, the vast majority of which are not involved in any illicit behavior.

Traditionally, a retailer's Loss Prevention team uses tellers or security personnel present at checkout, manual video surveillance to monitor the checkout process, or electronic article surveillance (EAS) tags on items to prevent shrink. However, having a person present and the manual video monitoring approach are labor intensive and, perhaps, are not completely practical to deter shrink at stores with a large number of point of sale (POS) devices. Further, thieves have learned how to circumvent EAS tags. Other non-traditional methods to prevent shrink at checkouts include video analytics or computer vision detection. Companies that provide these shrink detection methods include, for example, Stop-Lift and Everseen. These methods can be effective, but require the theft events to be in clear sight of existing camera views or may require an additional investment of cameras at each POS. Also, until video analytic technology improves, most shrink detection video implementations include a manual validation step to confirm the event before taking actions. At self-service checkout (SSCO), most vendors, such as NCR, provide weight based item security and some vendors have versions of visual analysis, e.g., NCR's SmartAssist, Produce Assurance, and PickList Assist. However, many large retailers have disabled weight based item security in favor of allowing customers to be more productive and improve their experiences by significantly reducing attendant interventions. Furthermore, the visual analysis methods typically depend on the customer placing the item on or pass it by the scanner, but many shrink events at SSCOs involve the customer skipping the scanner and bagging item directly or leaving items in the shopping cart. Similar theft can also occur at teller-assisted checkout stations, such as among friends or by disgruntled employees.

Current solutions for detecting shrink, or at least a certain likelihood therefore, while helpful, remain deficient.

SUMMARY

Various embodiments herein each include at least one of systems, methods, and software for in situ and network-based transaction classification. Such embodiments use advanced data analytics and machine learning techniques of consumer's transaction attributes to reduce shrink at checkout, including both self-service and staffed (cashier) registers, i.e., SSCO and teller-assisted checkouts.

One embodiment, in the form of a method, includes processing a dataset of transactions to identify normal transaction patterns and processing a dataset of transactions that included known fraud to identify variation patterns between the identified normal transaction patterns and the data of each transaction. The method further includes generating at least one pattern model based on the identified normal transaction patterns and the identified variation patterns. In such embodiments, each pattern model typically includes classification values for determining a likelihood of fraud in transactions. The method continues by applying the model to a current transaction to calculate a score indicative of a likelihood of fraud and outputs the score.

Another method embodiment includes generating a model from patterns identified in normal and fraudulent transaction data. Each of such identified patterns typically includes a classification value that contributes to a transaction classification value indicating a likelihood of fraud in a given transaction. This method further includes applying the model to a current transaction to obtain classification values to calculate a transaction classification value indicating a likelihood of fraud in the current transaction and then outputting the score as an indicator of potential fraud.

A further embodiment in the form of a point-of-sale (POS) system includes a processor and a memory device. The memory device of such embodiments stores instructions executable by the processor to perform data processing activities. The data processing activities may include applying a model to a current transaction to obtain classification values to calculate a transaction classification value indicating a likelihood of fraud in the current transaction. This model includes data representations of patterns in normal and fraudulent transaction data and each pattern includes a classification value that contributes to a transaction classification value indicating a likelihood of fraud in a given transaction. The data processing activities also include interrupting operation of the POS system when a transaction classification value exceeds a threshold indicating a likelihood of fraud.

DETAILED DESCRIPTION

Figure 1:
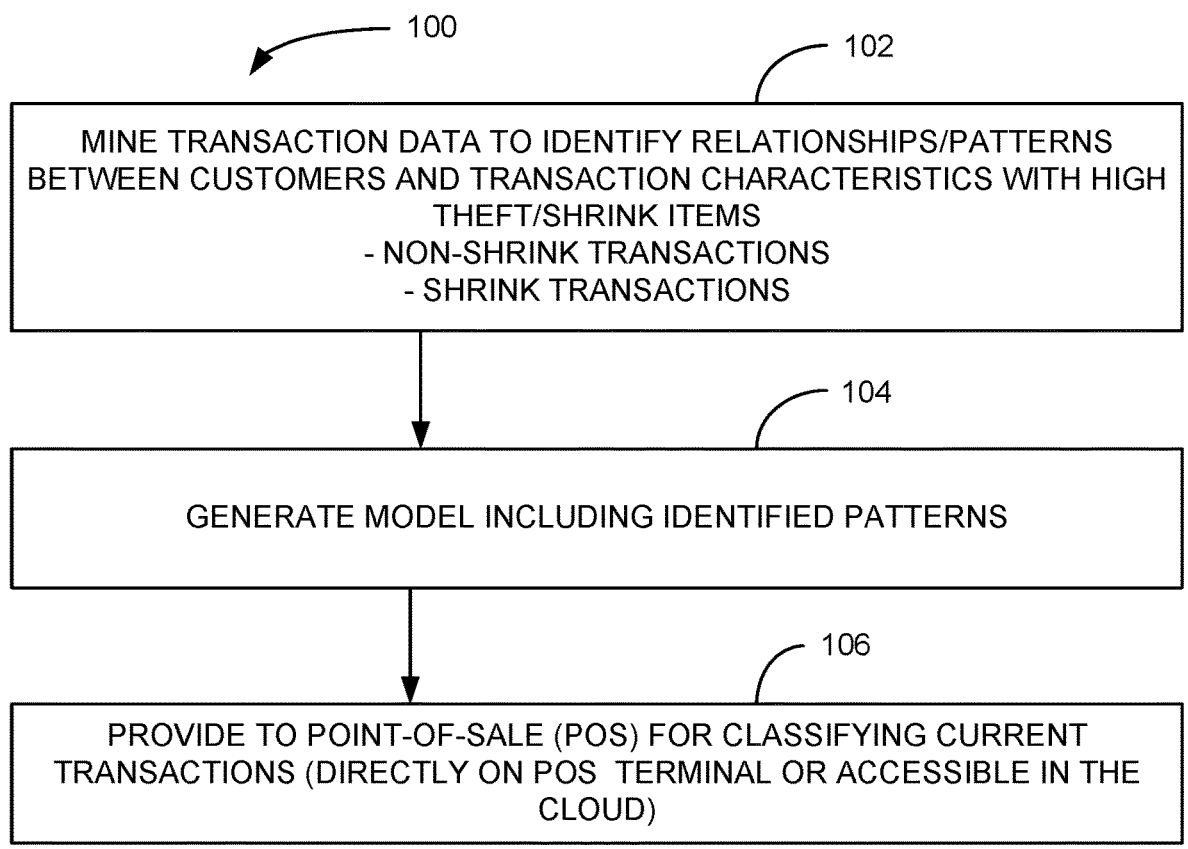
FIG. 1 is a block flow diagram of a method, according to an example embodiment.

The pecuniary value of interest that is the subject of retailer shrink is quite substantial. As an illustration, The National Retail Federation and University of Florida estimated that overall shrinkage, at checkout and other locations in the store, at U.S. retailers in 2015 was $45.2 billion. Furthermore, U.S. retail industry shrink is getting worse as 2015 losses were $1.2 billion more than in 2014. The various embodiments herein operate to reduce this shrinkage cost for retailers. It is estimated that the embodiments herein, when used as a module of a layered security approach, can help detect an incremental 0.5% to 1% of shrink events. Based on the above 2015 U.S. retail cost of shrinkage, the potential savings to the U.S. retailer industry, if widely adopted, could be approximately $225 to $450 million annually.

The embodiments herein present systems and methods using advanced data analytics and machine learning techniques to alert retailers, in real time, to potential shrink events at checkout based on basket item patterns and customer characteristics. When such embodiments are deployed as part of a layered security approach augmenting current shrink mitigation methods, shrink prevention security becomes quite robust. The predictive embodiments herein can be used to increase the effectiveness of other shrink detection/monitoring solutions by focusing those resources in real-time when and where shrink is most likely occurring.

In the following detailed description, reference is made to the accompanying drawings that form a part hereof, and in which is shown by way of illustration specific embodiments in which the inventive subject matter may be practiced. These embodiments are described in sufficient detail to enable those skilled in the art to practice them, and it is to be understood that other embodiments may be utilized and that structural, logical, and electrical changes may be made without departing from the scope of the inventive subject matter. Such embodiments of the inventive subject matter may be referred to, individually and/or collectively, herein by the term "invention" merely for convenience and without intending to voluntarily limit the scope of this application to any single invention or inventive concept if more than one is in fact disclosed.

The following description is, therefore, not to be taken in a limited sense, and the scope of the inventive subject matter is defined by the appended claims.

The functions or algorithms described herein are implemented in hardware, software or a combination of software and hardware in one embodiment. The software comprises computer executable instructions stored on computer readable media such as memory or other type of storage devices. Further, described functions may correspond to modules, which may be software, hardware, firmware, or any combination thereof. Multiple functions are performed in one or more modules as desired, and the embodiments described are merely examples. The software is executed on a digital signal processor, ASIC, microprocessor, or other type of processor operating on a system, such as a personal computer, server, a router, or other device capable of processing data including network interconnection devices.

Some embodiments implement the functions in two or more specific interconnected hardware modules or devices with related control and data signals communicated between and through the modules, or as portions of an application-specific integrated circuit. Thus, the exemplary process flow is applicable to software, firmware, and hardware implementations.

FIG. 1 is a block flow diagram of a method 100, according to an example embodiment. The method 100 provides a high-level perspective of a process according to some embodiments. Some such embodiments use data modeling of customer market basket data, that is items presented at checkout for purchase, to gain insight into the normal relationships between customer transaction characteristics and high theft items. Next, these embodiments analyze detailed market basket data from customer transactions where shrink occurred, such as where a store's Loss Prevention team intervened to stop the theft or theft or customer or staff error/oversight/other mistake led to shrinkage, to learn potential connections between basket data, types of shrink practices. Types of shrink practice may include item substitution, double stacking products, masking universal product codes, combinations of products, and customer characteristics, among others. Insights from this analysis allows for creation of one or more analytic models using machine learning algorithms, which may include one or more of correlation analysis, logistic regression, neural networks and others, to predict, or score, the likelihood of shrink for a future transaction based on customer and transaction characteristics. Such embodiments build models each including one or more data representations of patterns of normal and shrink-related transactions to automate shrink prediction in real time to provide alerts to the retailer. The alerts may include POS terminal interrupts requiring store personnel for clearing, directing video monitoring personnel to watch the POS terminal, directing personnel to the POS terminal, and the like.

As discussed above, the first step is to mine 102 the retailer detailed POS and basket data to learn the relationships in the form of patterns between customer and transaction characteristics with high theft items when customers purchase these items. The mining 102 is performed to generate 104 a model including the learned patterns for an analytic framework of transactions from paying customers that include high theft items. The generated 102 model includes data representation of patterns identified in normal, non-shrink transactions and transactions confirmed to include shrink. The detailed POS data may include, for example:

a. Store ID;
 b. Store banner or region ID;
 c. Transaction ID;
 d. Register ID;
 e. Date;
 f. Time;
 g. Cashier ID or self-checkout attendant ID;
 h. Transaction cancellation event (cancelled, e.g., "1" or not, e.g., "0");
 i. Items (or SKU) ID;
 j. Items description;
 k. Items price ($);
 l. Voided event;
 m. Quantity key event;
 n. Payment type: Cash, Credit card by type (e.g., Coles card, American Express, MasterCard, etc.), debit, check, EBT, others;
 o. Client loyalty card ID;
 p. Number of coupons;
 q. Shrink indicator (True/1 indicating an actual or attempted theft/shrink,
 False/0 indicating normal transaction); and
 r. Others.

Once transaction patterns are generated 104 into a model which is then tested and validated, the model is provided 106 to a processing engine that evaluates transaction data in near or actual real-time to identify when a shrink event is occurring. The near or actual real-time monitoring of transaction may be implemented as an add-on application to a retailers POS software systems, through a network accessible cloud application or mobile application to alert a self-checkout attendant or a front-end supervisor to potential transactions where shrink may be occurring using the current item and transaction characteristics. Detection of a possible shrinkage event may also or alternatively be transmitted to another shrink-prevention solution, such as an image or video processing system that processes images or video to identify or confirm attempted theft or other system involved in shrinkage prevention. The cloud based solution may be implemented on a network accessible server that is located in a store, in a backend system of a store or a chain of stores, be hosted by a shirk detection service provider, and the like.

Such embodiments are flexible and easily calibrated to a retailer's unique domain by generating models that allows for model generation 102 for individual stores, regions where stores are located, specific terminals, and the like. Some such embodiments may also be enhanced by segmenting a retailer's store network into categories by banners or regional segments based on different types of customer categorization, customer shopping patterns (time of day, day of week, etc.), or by most commonly stolen items.

Of particular note is that it is difficult for a single shrink detection system to prevent all occurrences of shrink at checkout. As such, the present embodiments, such as the method 100 may be implemented by retailers as one of a multiple-layer defense to mitigate shrinkage at checkout. These embodiments are an ideal extension to existing practices to provide a layered approach to help mitigate shrink at checkout.

Figure 2:
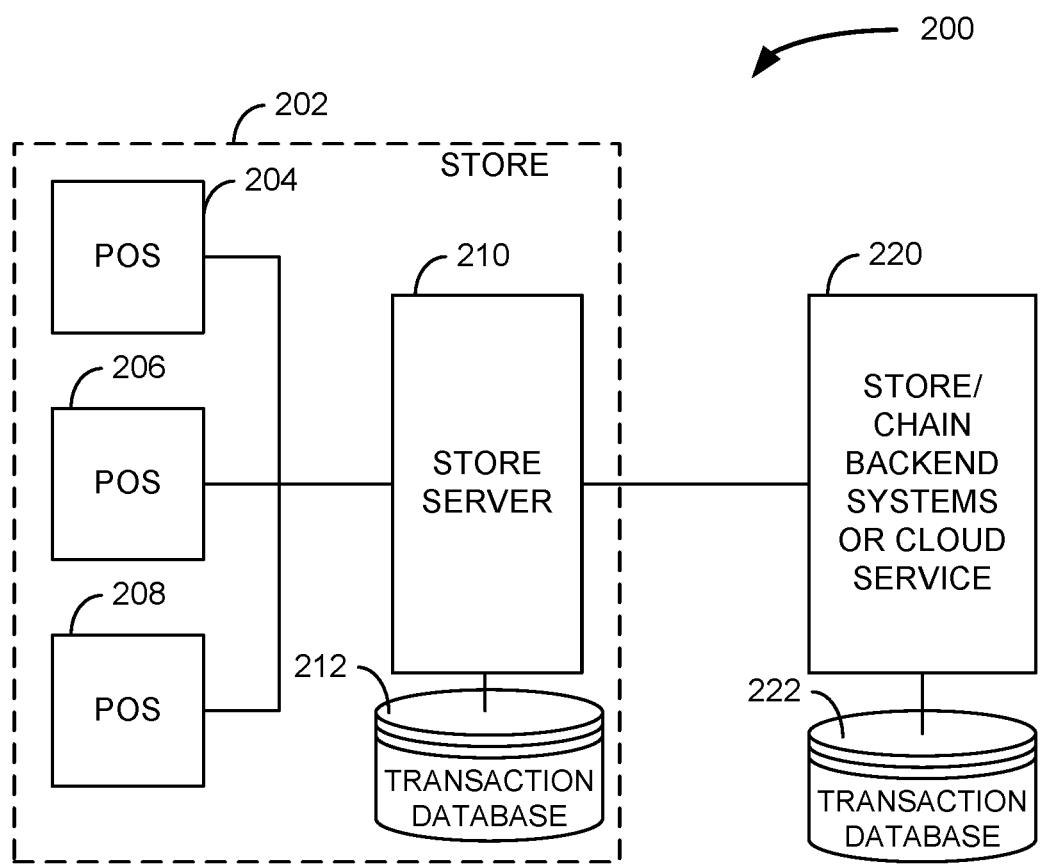
FIG. 2 is a logical block diagram of a system architecture, according to an example embodiment.

FIG. 2 is a logical block diagram of a system 200 architecture, according to an example embodiment. The system 200 is a system on which transactions are conducted and from which data is gathered for which patterns of normal and fraudulent, shrink-related transactions are identified and models built from. The generated models are then pushed back down to be made available to classify transactions in actual or near real-time.

The system 200 includes a store 202 in which one or more POS terminals 204, 206, 208 are deployed. The POS terminals 204, 206, 208 may be one or a mix of teller/cashier assisted or SSCO terminals. Transactions are conducted on the POS terminals 204, 206, 208 and data collected in a database, such as transaction database 212 or 222. Transaction data may be tagged as being a transaction that involved shrinkage such as theft, item substitution, failure to scan (intentional or accidental), and the like. The POS terminals 204, 206, 208 may have a model deployed thereto or as may be accessed through a service provided by a store server 210 or by a store or chain server or cloud service 220. The model is generated form the transaction data stored in one or both of the transaction databases 212, 222. The model is typically generated to identify patterns in normal, non-fraudulent transactions and transactions confirmed to include shrinkage or other fraud. The patterns are then assembled into a model that is then deployed as discussed above. The model may then be used to determine a likelihood of shrinkage or other fraud being involved in a current transaction at one of the POS terminals 204, 206, 208.

The model may be applied to transaction data on one or more of the POS terminals 204, 206, 208, the store server 210, and the server 220. When a potential for fraud is identified, such s when a scoring algorithm associated with the model reaches a threshold for a current transaction, various actions may be taken. For example, an interrupt may be communicated to the POS terminal 204, 206, 208 on which the transaction is being conducted requiring attendant or supervisor intervention to continue, security personnel or other personnel may be alerted, data of the potential for shrinkable or other fraud may be communicated to another shrinkage mitigation or other security system where a multi-layered security approach is installed, and the like.

Figure 3:
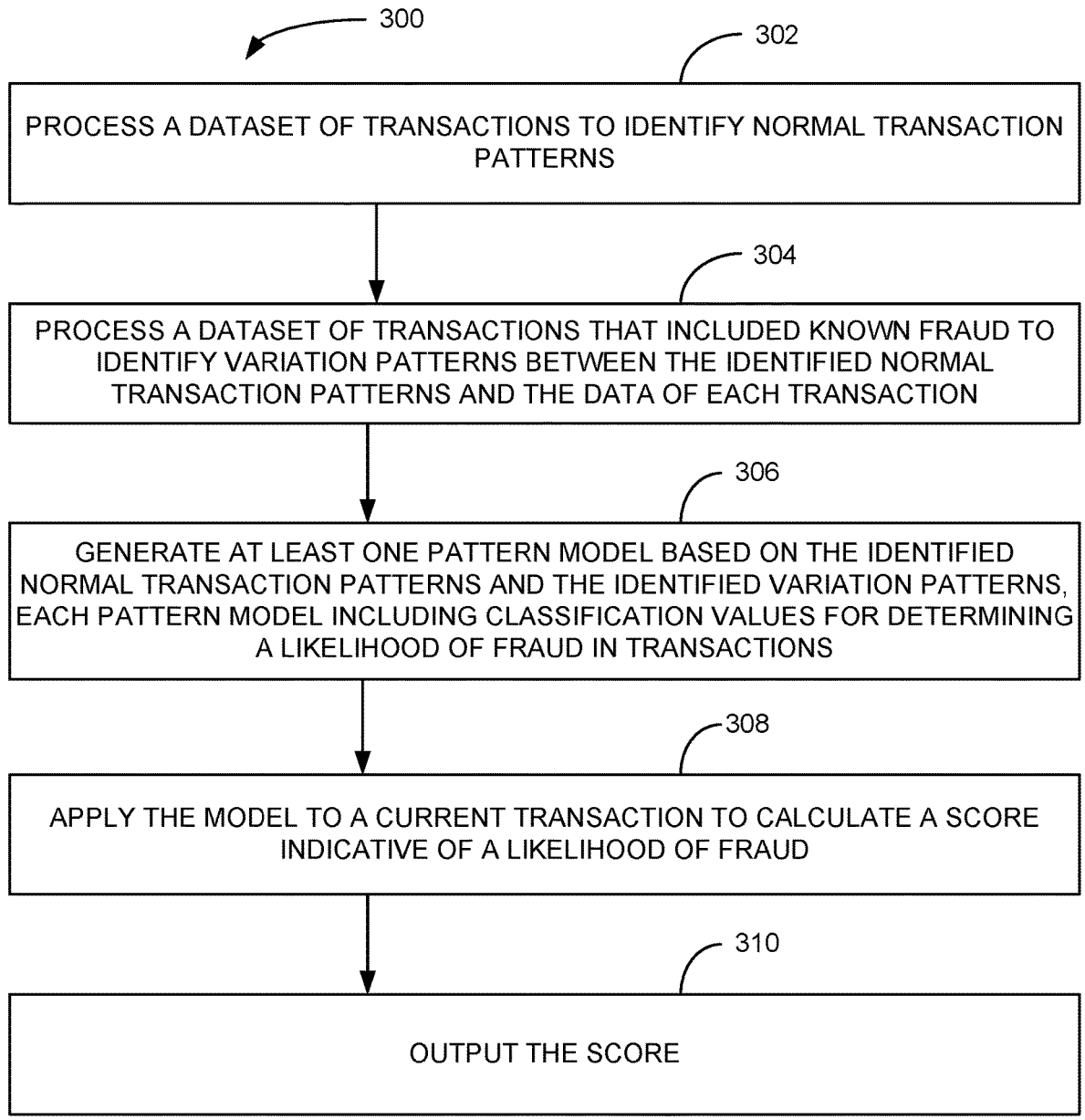
FIG. 3 is a block flow diagram of a method, according to an example embodiment.

FIG. 3 is a block flow diagram of a method 300, according to an example embodiment. The method 300 is an example of a method that may be performed in whole or in part on a POS terminal, a store server, another server or other computing device that has or has access to transaction data of normal retailer transactions and transactions confirmed to include fraud. The method 300 includes processing 302 a dataset of transactions to identify normal transaction patterns and processing 304 a dataset of transactions that included known fraud to identify variation patterns between the identified normal transaction patterns and the data of each transaction. The method 300 further includes generating 306 at least one pattern model based on the identified normal transaction patterns and the identified variation patterns. In such embodiments, each pattern model includes classification values for determining a likelihood of fraud in transactions. The method 300 also includes applying 308 the model to a current transaction to calculate a score indicative of a likelihood of fraud, which may include shrinkage. The method 300 may then output 310 the score.

The datasets that are processed 302, 304 may be from a specific store, a specific POS terminal in the store, a city or other region, all stores in a chain, many stores of the same type (e.g., grocery or discount retailer), or other group. The datasets that are used are stores or the types of stores where the generated 306 model will be applied 308.

In some embodiments of the method 300, data of a transaction within the datasets of transactions includes a plurality of data items including data identifying at least one product ID, a date and time, and a point of sale terminal identifier. In some such embodiments, the data of a transaction includes additional data including data identifying, directly or indirectly, customer data. The customer data may include payment type and amount data, demographic data, purchase history data.

In another embodiment of the method 300, applying 308 the model to a current transaction includes comparing current transaction data to patterns represented in the model to obtain a score indicative of a likelihood of fraud being present in the current transaction. In some such embodiments, a score is obtained from the current transaction data with regard to at least some of the patterns represented in the model based on the classification values of the respective patterns and potential fraud is indicated when a sum of the pattern scores is greater than a sum threshold. In some such embodiments, potential fraud may also be indicated when an individual pattern score or a sum of a specific group of pattern scores is greater than a threshold for the respective individual pattern or the specific group of patterns.

In the method 300, outputting 310 the score may include outputting an indicator of potential fraud. In some of these embodiments, the output 310 score may then be combined with a score received or derived from data received from another process, such as another security system deployed to reduce shrinkage. In such embodiments, when the combined score is greater than a threshold, the method 300 includes outputting an intervention interrupt to a point-of-sale terminal where the transaction is being conducted.

Figure 4:
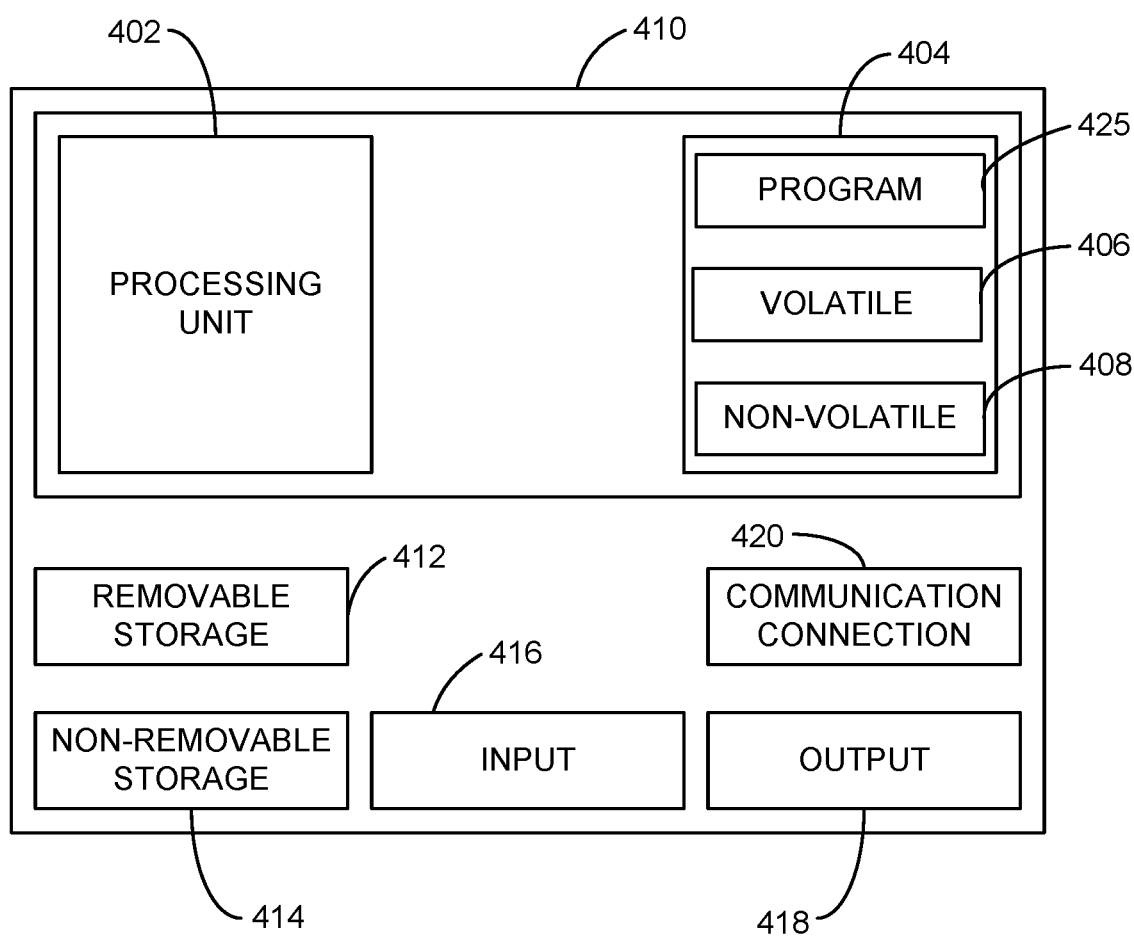
FIG. 4 is a block diagram of a computing device, according to an example embodiment.

FIG. 4 is a block diagram of a computing device, according to an example embodiment. In one embodiment, multiple such computer systems are utilized in a distributed network to implement multiple components in a transaction based environment. An object-oriented, service-oriented, or other architecture may be used to implement such functions and communicate between the multiple systems and components. One example computing device in the form of a computer 410, may include a processing unit 402, memory 404, removable storage 412, and non-removable storage 414. Memory 404 may include volatile memory 406 and non-volatile memory 408. Computer 410 may include—or have access to a computing environment that includes—a variety of computer-readable media, such as volatile memory 406 and non-volatile memory 408, removable storage 412 and non-removable storage 414. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions. Computer 410 may include or have access to a computing environment that includes input 416, output 418, and a communication connection 420. The computer may operate in a networked environment using a communication connection to connect to one or more remote computers, such as database servers. The remote computer may include a personal computer (PC), server, router, network PC, a peer device or other common network node, or the like. The communication connection may include a Local Area Network (LAN), a Wide Area Network (WAN) or other networks.

Computer-readable instructions stored on a computer-readable medium are executable by the processing unit 402 of the computer 410. A hard drive, CD-ROM, and RAM are some examples of articles including a non-transitory computer-readable medium. For example, a computer program 425 capable of performing the method 100 of FIG. 1 or the method 300 of FIG. 3.

It will be readily understood to those skilled in the art that various other changes in the details, material, and arrangements of the parts and method stages which have been described and illustrated in order to explain the nature of the inventive subject matter may be made without departing from the principles and scope of the inventive subject matter as expressed in the subjoined claims.

What is claimed is:

1. A method comprising:
processing, on a computer processor, a dataset of point of sale (POS) terminal transactions to identify normal transaction patterns;
processing, on the computer processor, a dataset of transactions that included known fraud to identify variation patterns between the identified normal transaction patterns and the data of each transaction;
generating, by the computer processor, at least one pattern model based on the identified normal transaction patterns and the identified variation patterns, each pattern model including classification values for determining a likelihood of fraud in transactions;
applying, by the computer processor, the model to a current POS terminal transaction to calculate a score indicative of a likelihood of fraud; and
outputting, from the computer processor, the score.

2. The method of claim 1, wherein data of a transaction within the datasets of transactions includes a plurality of data items including data identifying at least one product ID, a date and time, and a point of sale terminal identifier.

3. The method of claim 2, wherein the data of a transaction includes additional data including data identifying, directly or indirectly, customer data.

4. The method of claim 3, wherein the customer data includes payment type and amount data, demographic data, purchase history data.

5. The method of claim 1, wherein applying the model to a current transaction includes comparing current transaction data to patterns represented in the model to obtain a score indicative of a likelihood of fraud being present in the current transaction.

6. The method of claim 5, wherein:
a score is obtained from the current transaction data with regard to at least some of the patterns represented in the model based on the classification values of the respective patterns; and
potential fraud is indicated when a sum of the pattern scores is greater than a sum threshold.

7. The method of claim 6, wherein potential fraud is also indicated when an individual pattern score or a sum of a specific group of pattern scores is greater than a threshold for the respective individual pattern or the specific group of patterns.

8. The method of claim 6, wherein outputting the score includes outputting an indicator of potential fraud.

9. The method of claim 8, further comprising:
combining the score with a score received or derived from data received from another process; and
when the combined score is greater than a threshold, outputting an intervention interrupt to a point-of-sale terminal where the transaction is being conducted.

10. The method of claim 1, wherein the dataset of transaction processed to identify normal transaction patterns is a dataset of transactions of a specific store location for which the model will be utilized.

11. A method comprising:
generating, on a computer processor, a model from patterns identified in normal and fraudulent point of sale (POS) terminal transaction data, each pattern including a classification value that contributes to a transaction classification value indicating a likelihood of fraud in a given transaction;
applying, on the computer processor, the model to a current POS terminal transaction to obtain classification values to calculate a transaction classification value indicating a likelihood of fraud in the current transaction; and
outputting, from the computer processor, the score as an indicator of potential fraud.

12. The method of claim 11, wherein the normal and fraudulent transaction data includes a plurality of data items including data identifying at least one product ID, a date and time, and a point of sale terminal identifier.

13. The method of claim 12, wherein the data of a transaction includes additional data including customer data, the customer data including at least two of payment type and amount data, demographic data, purchase history data.

14. The method of claim 11, wherein applying the model to a current transaction includes comparing current transaction data to patterns represented in the model to obtain a score indicative of a likelihood of fraud being present in the current transaction.

15. The method of claim 14, wherein:
a score is obtained from the current transaction data with regard to at least some of the patterns represented in the model based on the classification values of the respective patterns; and
potential fraud is indicated when:
a sum of the pattern scores is greater than a sum threshold; or
an individual pattern score or a sum of a specific group of pattern scores is greater than a threshold for the respective individual pattern or the specific group of patterns.

16. The method of claim 15, further comprising:
combining the score with a score received or derived from data received from another process; and
when the combined score is greater than a threshold, outputting an intervention interrupt to a point-of-sale terminal where the transaction is being conducted.

17. The method of claim 11, wherein the normal and fraudulent transaction data the is processed to generate the model of patterns is a dataset of transactions of a specific store or a set of stores where the model will be utilized.

* * * * *